US005989100A

United States Patent [19]

Kovach

[11] Patent Number: 5,989,100
[45] Date of Patent: Nov. 23, 1999

[54] BEE DISSEMINATOR OF BIOLOGICAL CONTROLS

[75] Inventor: Joseph Kovach, Geneva, N.Y.

[73] Assignee: Cornell Research Foundation, Inc., Ithaca, N.Y.

[21] Appl. No.: 08/925,194

[22] Filed: Sep. 8, 1997

[51] Int. Cl.[6] .................... A01K 47/06

[52] U.S. Cl. .................... 449/20

[58] Field of Search .................... 449/18, 19, 20, 449/25

[56] References Cited

U.S. PATENT DOCUMENTS

| | | | |
|---|---|---|---|
| 2,435,951 | 2/1948 | Antles . | |
| 2,485,879 | 10/1949 | Harwood . | |
| 3,069,702 | 12/1962 | Reed . | |
| 3,200,419 | 8/1965 | Root | 449/25 X |
| 3,371,360 | 3/1968 | Antles . | |
| 3,995,338 | 12/1976 | Kauffeld . | |
| 4,308,627 | 1/1982 | Wallace . | |
| 4,412,363 | 11/1983 | Robson et al. . | |
| 4,494,263 | 1/1985 | Brown | 449/19 |
| 4,594,744 | 6/1986 | Ferrari . | |
| 5,348,511 | 9/1994 | Gross et al. | 449/2 |

*Primary Examiner*—Robert P. Swiatek
*Attorney, Agent, or Firm*—Brown, Pinnisi & Michaels

[57] ABSTRACT

A bee dissemination device or dispenser that is non destructive to the hive, is easy to insert, refill, and remove includes a cartridge insertable in a housing. The device is designed to be used by a non professional bee keeper, such as a grower. It is inserted into the entrance of a standard bee hive with minimal disruption to the hive or colony. When the bees exit the hive, they walk up a ramp through a dry biological control suspension and leave the hive, carrying and depositing the biological control agent onto the flowers as they pollinate the crop. When the biological control agent runs low, additional material is added easily by lifting a hinged lid or replacing the old cartridge with a filled one. The lid also provides some moisture protection to keep the biological agent dry, thereby facilitating bee inoculation. The dispenser is removed by simply pulling it from the hive entrance when pollination activities are completed. The removal is non disruptive and does not destroy the integrity of the hive. When the device is inserted, refilled, or removed at night, minimal protective clothing is required by the user.

17 Claims, 3 Drawing Sheets

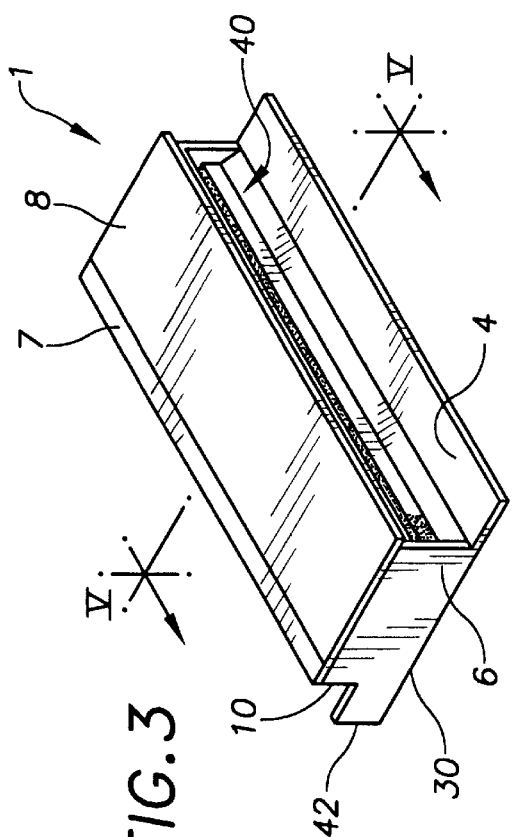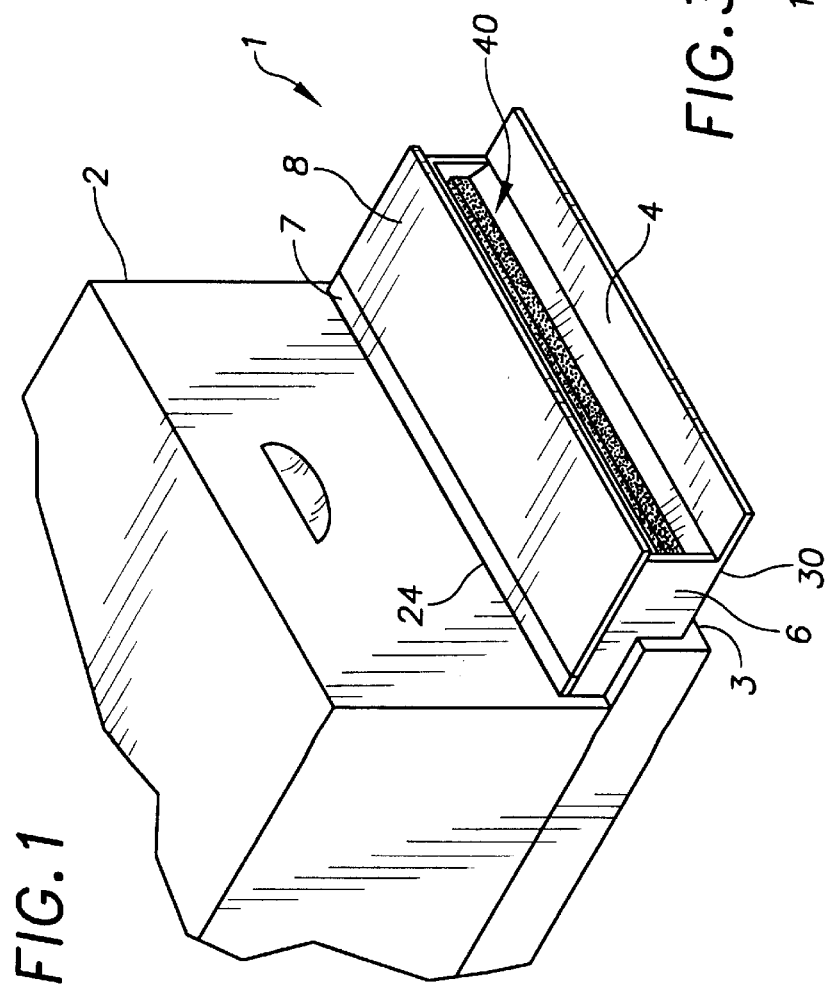

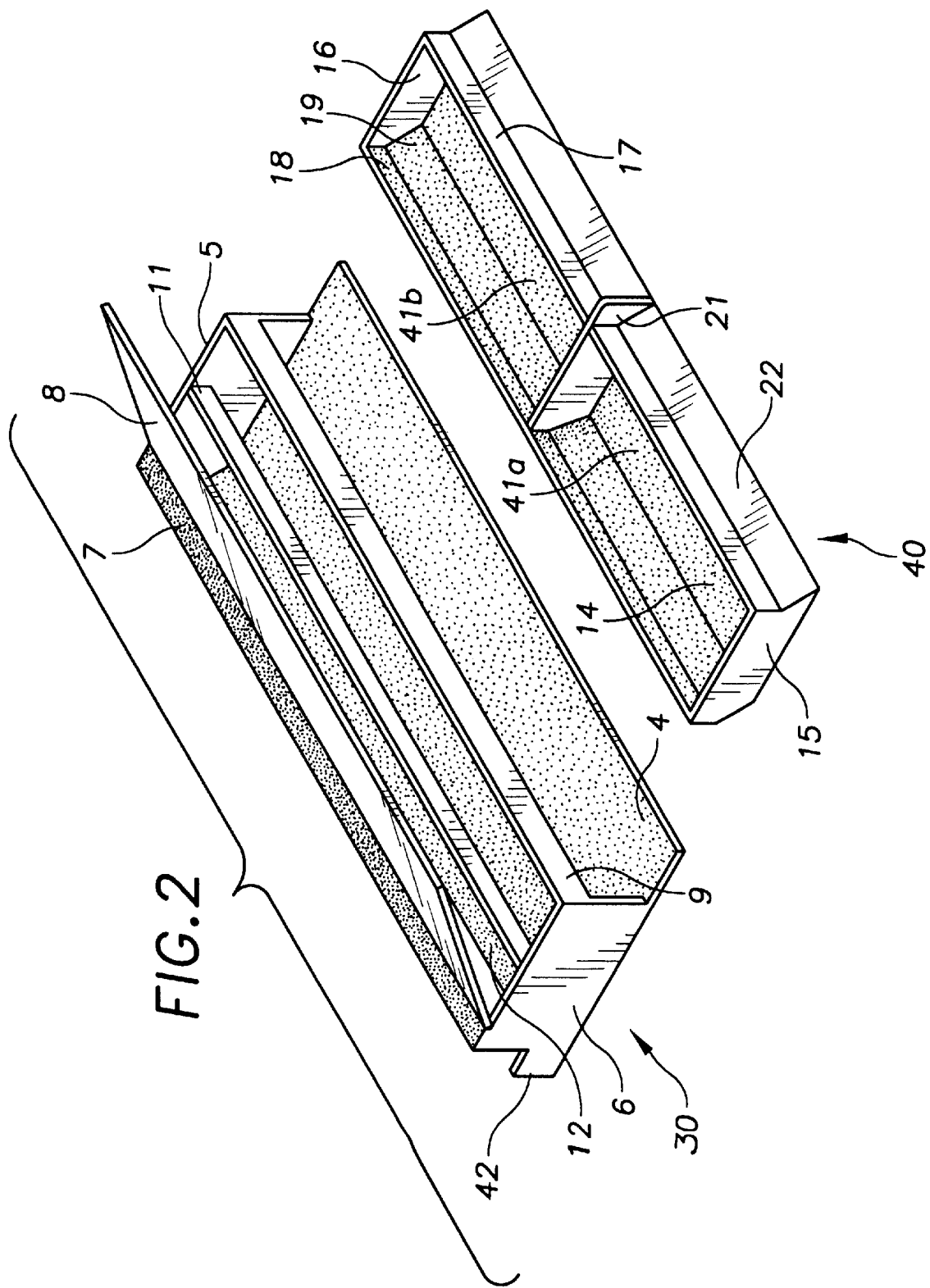

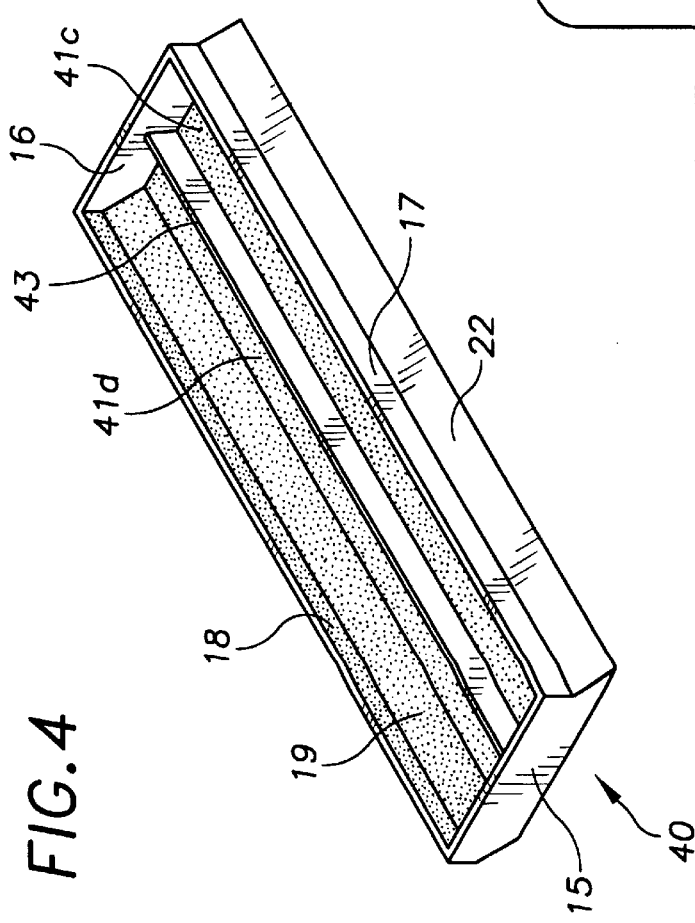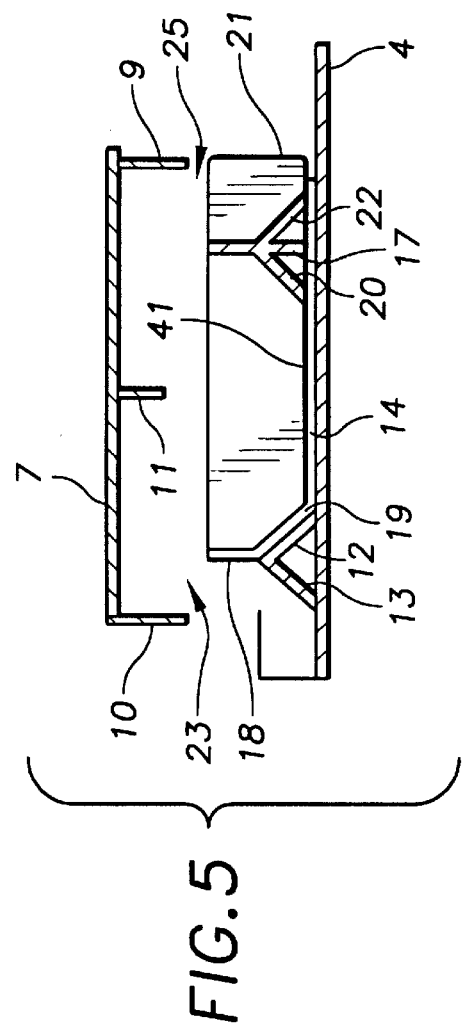

BEE DISSEMINATOR OF BIOLOGICAL CONTROLS

FIELD OF THE INVENTION

The invention pertains to the field of biocontrol dissemination through the use of bees. More particularly, the invention pertains to a disseminator device, installable in a beehive, which contains biological control agents or other substances which are spread by the bees.

BACKGROUND OF THE INVENTION

Because bees have evolved to carry and disseminate pollen and other microscopic matter, it is a natural extension to use bees to carry microscopic biological control agents to protect plants from certain insect and diseases. Over the last few years, several authors have reported using honey bees to carry biological antagonists to control insects and diseases that attack plants. Gross et al. (1994) used honey bees as disseminators of a virus that controlled the corn earworm on crimson clover and developed an applicator for that purpose. Thomson et. al (1992) used commercial pollen trays to inoculated the bees with a biological antagonist that protected apples and pears from fire blight. Peng et al. (1992) designed a dispenser to contaminate honey bees with a biological control agent to control Botrytis fruit rot on strawberries. Each of these applicator/disseminator devices were effective in inoculating the bees with the biologicals but they are cumbersome and difficult to use especially by a non professional bee keeper.

Because recent research has shown that bee disseminated biological antagonists can control two different diseases on apples, pears, and strawberries, there is potentially a large market for this biological approach. Currently in the United States, there are about 45,000 acres of strawberries, 330,000 acres of apples and 67,000 acres of pears under cultivation. Each year these crops have to be pollinated and protected from Botrytis fruit rot or fire blight.

A number of known devices are mounted on the opening of bee hives which direct bees in and out of the hive. Such devices frequently surface-contaminate a bee with live pollen for dissemination outside the hive. Most of these devices include a hive entrance modifier forming a downwardly sloping ramp used by entering and exiting bees. Pollen is poured into the funnel-shaped region formed by the ramp and it is picked up by the bees as they exit the hive. A disadvantage of these devices is that they need to be serviced frequently (every 1–2 hours) by adding teaspoons of pollen or biocontrol agents into the funnel. If refilling is not done frequently, than bees exiting the hive are without their pollen or biocontrol payload.

U.S. Pat. Nos. 2,435,951 (Antles), 2,485,879 (Harwood), and 3,371,360 (Antles et al.) disclose hive exit devices, as described above, that require frequent refilling and only coat the bees as they exit the hive. Because the entire entrance/exit region of the hive is not totally covered by these devices, some exiting bees avoid the device and do not come in contact with the pollen or biocontrol agent. This obviously reduces biocontrol efficacy in the field. Although U.S. Pat. No. 4,594,744 (Ferrari) discloses a device that forces the bees to contact the pollen or the biocontrol material as they exit the hive, the device requires frequent refilling.

U.S. Pat. No. 3,069,702 (Reed) has a large storage area and contains a feeder wheel that automatically deposits the material onto the bees. However, it has moving parts that can fail and require maintenance. In addition, this feeder constantly deposits material across the exit of the hive even when the bees are inactive. Depending on the formulation of the biocontrol agent, clogging of the apparatus is possible, resulting in less material being applied to the bees.

U.S. Pat. No. 4,412,363 (Robson) discloses an apparatus for collecting and distributing pollen that is dimensioned to fit within the stack of hives (supers) that form a segmented bee colony. The apparatus includes a removable tray, but removing and inserting a new tray can be difficult because of dead bee bodies and caking problems.

U.S. Pat. No. 5,348,511 (Gross et al.) discloses a device placed in front of beehives to disseminate biocontrol agents. Although this device has a removable tray, removing and inserting a new tray can be difficult because of dead bee bodies and caking problems. In addition, a major disadvantage of this device is that it requires cutting a fairly large hole in the hive for attachment.

Most of the currently available devices only hold a few teaspoons of material and need to be recharged frequently. Although this may be fine for research purposes using only a few hives, it does provide practical limitations for commercial applicability.

SUMMARY OF THE INVENTION

The invention reduces the number of recharging forays needed to service the device and provides the opportunity to have the same hive disseminate different biocontrol agents. It is a two piece structure that includes a semi-permanent housing that fits standard commercial hives and a removable/disposable cartridge filled with the biocontrol agent. By prepackaging the cartridge with the biocontrol agent, human contact with the biocontrol agent during recharging is minimized. The cartridge can provide several days of usable material to the bees before it needs changing. As the cartridge is emptied or the biocontrol material becomes caked because of moisture from the bees, a new one is easily inserted to ensure continual dispersal of the biocontrol agent to the field or orchard. Because each set of cartridges can contain a different biological control agent, greater flexibility and specificity can be incorporated into a biological control strategy. For example, one group of bees hives may disperse one type of biocontrol agent for the control of one pest and another group of beehives can be used to disseminate another biocontrol to control another pest. In addition, different combinations of biocontrols may be used in the same hive to specifically tailor the bee dose to the individual field or commodity conditions.

The present invention is superior to the current state of the art. First, the invention includes a removable/disposable cartridge, so that prepackaging the cartridge with a biocontrol agent is possible. Not only does this reduce human contact with the biocontrol agent when changing cartridges, it also insures biocontrol agent freshness. Second, the invention adds value to the beehive by increasing its flexibility. The same bees can be used to disseminate different biological control agents to control different pests simply by inserting a new cartridge. Finally, the invention is easy to clean and service. Because it has a large holding tray in the cartridge, the number of refilling forays is reduced. Moreover, having a lid on the housing makes cleaning easier should the biocontrol material ever become caked due to moisture from the bees.

BRIEF DESCRIPTION OF THE DRAWING

FIG. 1 shows a perspective view of a dissemination device according to the present invention inserted into a commercial beehive.

FIG. 2 shows a perspective view of a housing and a cartridge that together form the device of the present invention.

FIG. 3 shows a perspective view of the cartridge inserted into the housing.

FIG. 4. shows a perspective view of an alternative embodiment of a tray arrangement in a cartridge of the present invention.

FIG. 5 shows a partial sectional view along the line V—V in FIG. 3.

DESCRIPTION OF THE PREFERRED EMBODIMENT

Referring to FIGS. 1–3, a disseminator device 1 is preferably a two piece structure that includes a semi-permanent housing 30 that fits standard commercial hives and a removable/disposable cartridge 40 to be filled with a biocontrol agent. Housing 30 is preferably shaped to fit inside a commercial hive 2 by resting on a hive bottom board 3 and completely filling a hive entrance 24. In operation, device 1 is inserted into hive 2 so that it rests on hive bottom board 3 with a rear wall 10 against a front wall of hive 2. An opening 23 (FIG. 5) is positioned in registration with hive entrance 24.

Housing 30 includes a bottom 4, a side wall 5, and a side wall 6, all of which serve to support and contain cartridge 40. A tab 42 of side wall 6, along with a tab (not shown) of side wall 5, preferably extend into hive 2 to provide additional stability to housing 30. A top wall 7 and rear wall 10 are connected to side walls 5 and 6. A crosspiece 11 is preferably connected to an upper middle portion of side walls 5 and 6 for rigidity. Crosspiece 11 optionally acts as a rest for a lid 8, preferably hinged to either top wall 7 or side walls 5 and 6, when lid 8 is closed. Lid 8 preferably overlaps a front portion of side walls 5 and 6. When closed, lid 8 abuts top wall 7 so that bees are unable to pass between top wall 7 and lid 8. A front wall 9 supports lid 8 when closed and also restricts a size of an opening 25 in a front of housing 30.

Cartridge 40 fits into housing 30. The frame of removable cartridge 40 includes a bottom 14 connected to a rear wall 18 by a first internal ramp 19, which slopes from rear wall 18 to bottom 14. A front wall 17 is connected to bottom 14 by a second internal ramp 20, which slopes from front wall 17 to bottom 14. Two end walls 15 and 16 enclose the ends of cartridge 40. A cross piece 21 runs vertically between a middle of front wall 17 and rear wall 18 to provide rigidity to cartridge 40. Cross piece 21 preferably extends beyond front wall 17 so that the extension acts as a handle for easy removal and insertion of cartridge 40 into housing 30. Front wall 17 and rear wall 18, along with internal ramps 19 and 20, form a tray 41 that holds a substance such as a biological control agent or pollen. Cross piece 21 preferably divides tray 41 into two component trays 41a and 41b. A front ramp 22 slopes forward and down from front wall 17 to make it easier for the bees to enter and exit the device.

Referring to FIG. 4, tray 41 of cartridge 40 is shown divided into two trays 41c, 41d by a partition 43. Partition 43 is preferably sloped on both front and back surfaces to facilitate bee movement across trays 41c, 41d. Such a partition is used when it is desired that the bees transfer two different materials at the same time. Normally, however, a mixture of two different materials in tray 41 without separate trays 41a, 41b, 41c, or 41d is used. This alternative embodiment provides flexibility in the use of different substances that are applied by the bees simultaneously since premixing of the different substances is not required.

Referring also to FIG. 5, first ramp piece 12 is secured to bottom 4 and side wall 5 and 6 to act as a stop for cartridge 40. Second ramp piece 13 extends from first ramp piece 12 to bottom 4, thereby providing additional support to first ramp piece 12 in addition to providing a surface for the bees to walk on as they move in and out of disseminator device 1 through opening 23. A size of opening 23 is determined by the sizes of rear wall 10, first and second ramp pieces 12 and 13, and cartridge rear wall 18. Bottom 4 preferably extends forward of cartridge 40 when installed to make it easier for the bees to enter and exit device 1.

Cartridge 40 is vertically sized such that the bees have to walk inside device 1 and thus move along tray 41 on their way in and out of hive 2, while permitting sufficient ventilation to prevent mildew or similar problems from occurring within the hive complex.

The biocontrol agent is housed in separate removable cartridge 40 that requires less servicing (every several days) than devices according to the prior art and forces the bees to contact the biocontrol agent as they enter and exit the hive. Cartridge 40 is optionally packaged with the biocontrol agent already installed and a plastic wrap (not shown) over the top of cartridge 40 to prevent spillage or contamination. A new cartridge is easily installed by removing the plastic wrap and inserting the new cartridge in place of the old one.

The bees only contact the biocontrol material when they are actively foraging. Because the invention includes removable/disposable cartridge 40, fresh material is easily inserted, thereby reducing clogging and caking problems resulting in increased pick up efficiency by the bees.

The invention is easily applied in a non destructive manner to the entrance of most commercial beehives. Cartridge removal is not hampered by dead bees or caking problems. The removable cartridge 40 of the invention provides several days of bee coating capabilities before it needs changing. In addition, lid 8 provides added flexibility by giving access to installed cartridge 40 without removing cartridge 40 from housing 30.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A disseminator device, comprising:

a housing;

said housing having first and second openings therein;

said first opening being in a front of said housing;

said second opening being in a back of said housing;

said front of said housing being opposite said back of said housing;

a removable cartridge insertable in said housing through said first opening;

said cartridge including a tray for containing a substance when said tray is inserted into said housing; and said second opening of said housing shaped to communicate with a hive entrance of a beehive.

2. A device according to claim 1, wherein, when said beehive has a hive bottom board, said device is connectable to said beehive by resting on said hive bottom board of said hive and completely filling said hive entrance.

3. A device according to claim 1, further comprising a lid on said housing such that, when said cartridge is installed in said housing, said tray is accessible from outside said housing when said lid is in an open position.

4. A disseminator device, comprising:
a housing;
said housing having first and second openings therein;
a removable cartridge insertable in said housing through said first opening;
said cartridge including a tray for containing a substance;
said second opening of said housing shaped to communicate with a hive entrance of a beehive;
wherein said housing comprises
a bottom;
a top wall;
a rear wall;
first and second side walls connected to said bottom, said rear wall, and said top wall;
a first ramp piece connected to said bottom and said first and second side walls;
said first ramp piece limiting a distance said cartridge is inserted into said housing; and
a second ramp piece extending from a top of said first ramp piece to said bottom.

5. A device according to claim 4, wherein said housing further comprises:
a crosspiece extending between an upper portion of said first and second side walls; and
a portion of said bottom extending outward from said hive beyond said first opening.

6. A device according to claim 4, wherein said cartridge further comprises:
a first ramp portion congruent to said first ramp piece of said housing;
said first ramp portion forming a rear wall of said tray;
a second ramp portion forming a front wall of said tray; and
a crosspiece extending between said first and second ramp portions, whereby said tray is divided into two separate sections.

7. A disseminator device, comprising:
a housing;
said housing having first and second openings therein;
said first opening being in a front of said housing;
said second opening being in a back of said housing;
said front of said housing being opposite said back of said housing;
a removable cartridge insertable in said housing through said first opening;
said cartridge including a tray for containing at least one of a pollen and a biocontrol agent when said tray is inserted into said housing; and
a lid on said housing such that, when said cartridge is installed in said housing, said tray is accessible from outside said housing when said lid is in an open position.

8. A device according to claim 7, wherein, when a commercial hive has a hive bottom board and a hive entrance, said device is connectable to said commercial hive by resting on said hive bottom board of said hive and completely filling said hive entrance, wherein said second opening of said housing communicates with said hive entrance.

9. A dissemination device, comprising:
a housing;
said housing having first and second openings therein;
a removable cartridge insertable in said housing through said first opening;
said cartridge including a tray for containing at least one of a pollen and a biocontrol agent;
a lid on said housing such that, when said cartridge is installed in said housing, said tray is accessible from outside said housing when said lid is in an open position;
wherein said housing comprises
a bottom;
a top wall;
a rear wall;
first and second side walls connected to said bottom, said rear wall, and said top wall;
a first ramp piece connected to said bottom and said first and second side walls;
said first ramp piece limiting a distance said cartridge is inserted into said housing; and
a second ramp piece extending from a top of said first ramp piece to said bottom.

10. A device according to claim 9, wherein said housing further comprises:
a crosspiece extending between an upper portion of said first and second side walls; and
a portion of said bottom extending outward from said hive beyond said first opening.

11. A device according to claim 9, wherein said cartridge further comprises:
a first ramp portion congruent to said first ramp piece of said housing;
said first ramp portion forming a rear wall of said tray;
a second ramp portion forming a front wall of said tray; and
a crosspiece extending between said first and second ramp portions, whereby said tray is divided into two separate sections.

12. A disseminator device, comprising:
a housing;
said housing having first and second openings therein;
said first opening being in a front of said housing wherein bees entering said housing from outside a beehive enter said housing through said first opening;
a removable cartridge insertable in said housing through said first opening, such that said bees enter said housing through the same opening as said cartridge is inserted into said housing;
said cartridge including a tray for containing a substance; and
said second opening of said housing shaped to communicate with a hive entrance of said beehive such that bees leaving said beehive pass through said substance.

13. A device according to claim 12, wherein, when said beehive has a hive bottom board, said device is connectable to said beehive by resting on said hive bottom board of said hive and completely filling said hive entrance.

14. A disseminator device, comprising:
a housing;
said housing having first and second openings therein; a removable cartridge insertable in said housing through said first opening; said cartridge including a tray for containing a substance; said second opening of said housing shaped to communicate with a hive entrance of a beehive such that bees leaving said beehive pass through said substance;

wherein said housing comprises:

a bottom;

a top wall;

a rear wall;

first and second side walls connected to said bottom, said rear wall, and said top wall;

a first ramp piece connected to said bottom and said first and second side walls;

said first ramp piece limiting a distance said cartridge is inserted into said housing; and a second ramp piece extending from a top of said first ramp piece to said bottom.

15. A device according to claim 14, wherein said housing further comprises:

a crosspiece extending between an upper portion of said first and second side walls; and a portion of said bottom extending outward from said hive beyond said first opening.

16. A device according to claim 14, wherein said cartridge further comprises:

a first ramp portion congruent to said first ramp piece of said housing;

said first ramp portion forming a rear wall of said tray;

a second ramp portion forming a front wall of said tray; and a crosspiece extending between said first and second ramp portions, whereby said tray is divided into two separate sections.

17. A disseminator device, comprising:

a housing;

said housing having first and second openings therein;

a removable cartridge insertable in said housing through said first opening;

said cartridge including a tray for containing a substance;

said second opening of said housing shaped to communicate with a hive entrance of a beehive such that bees leaving said beehive pass through said substance; and a lid on said housing such that, when said cartridge is installed in said housing, said tray is accessible from outside said housing when said lid is in an open position.

* * * * *